US012769394B2

(12) United States Patent
Hatzianestis et al.

(10) Patent No.: US 12,769,394 B2
(45) Date of Patent: Oct. 20, 2026

(54) WIRELESS IMPLANT SYSTEM EMERGENCY SHUTDOWN

(71) Applicant: PRECISION NEUROSCIENCE CORPORATION, New York, NY (US)

(72) Inventors: Konstadinos Hatzianestis, New York, NY (US); Brian Otis, New York, NY (US); Benjamin I. Rapoport, New York, NY (US); Leonard Nevulis, New York, NY (US); Manuel Monge, New York, NY (US)

(73) Assignee: PRECISION NEUROSCIENCE CORPORATION, New York, NY (US)

( * ) Notice: Subject to any disclaimer, the term of this patent is extended or adjusted under 35 U.S.C. 154(b) by 0 days.

(21) Appl. No.: 18/812,716

(22) Filed: Aug. 22, 2024

(65) Prior Publication Data

US 2025/0068240 A1 Feb. 27, 2025

Related U.S. Application Data

(60) Provisional application No. 63/533,965, filed on Aug. 22, 2023.

(51) Int. Cl.
*G06F 3/01* (2006.01)
*G06F 11/30* (2006.01)

(52) U.S. Cl.
CPC .......... *G06F 3/015* (2013.01); *G06F 11/3055* (2013.01)

(58) Field of Classification Search
None
See application file for complete search history.

(56) References Cited

U.S. PATENT DOCUMENTS 5,709,689 A 1/1998 Ferrante et al.
5,910,282 A 6/1999 Grozdanovski et al.
(Continued)

FOREIGN PATENT DOCUMENTS

AU 2020428944 A1 9/2022
AU 2024203319 A1 6/2024
(Continued)

OTHER PUBLICATIONS

Camara C., et al., "Security and Privacy Issues in Implantable Medical Devices: a Comprehensive Survey," Journal of Biomedical Informatics, Jun. 11, 2015, vol. 55, 45 pages.
(Continued)

*Primary Examiner* — Sean Shechtman
(74) *Attorney, Agent, or Firm* — DLA Piper LLP US

(57) ABSTRACT

A system and methods for protecting the health of a user and the user's physiological data from unauthorized access by a third party during the operation of a neural implant is described. Based on a detected change in the internal state of the neural implant, or the detection of unauthorized access, an emergency system configuration change can be performed. One such emergency system configuration involves deactivating the implant to protect the user. The method can be for controlling a neural device in an implanted system. The method can include monitoring, by a monitoring device, the neural device; detecting, by the monitoring device, a condition associated with the neural device; and based on the condition detected by the monitoring device, deactivating the neural device.

17 Claims, 7 Drawing Sheets

(56) References Cited

U.S. PATENT DOCUMENTS

| | | | |
|---|---|---|---|
| 6,831,991 B2 | 12/2004 | Fridrich et al. | |
| 7,389,144 B1 | 6/2008 | Osorio et al. | |
| 7,818,061 B1 | 10/2010 | Palmer | |
| 7,925,350 B1 | 4/2011 | Palmer | |
| 8,156,568 B2 | 4/2012 | Gaitas et al. | |
| 8,170,670 B2 | 5/2012 | Stubbs et al. | |
| 8,515,538 B1 | 8/2013 | Osorio et al. | |
| 8,516,568 B2 | 8/2013 | Cohen | |
| 8,546,568 B2 | 10/2013 | Inouye et al. | |
| 8,634,918 B2 * | 1/2014 | Chambers .......... | A61N 1/36038 607/57 |
| 9,314,618 B2 | 4/2016 | Imran et al. | |
| 9,549,704 B1 | 1/2017 | Buerger et al. | |
| 10,135,849 B2 | 11/2018 | Jha et al. | |
| 10,265,081 B2 | 4/2019 | Kennedy et al. | |
| 10,363,420 B2 | 7/2019 | Fried et al. | |
| 11,013,923 B1 | 5/2021 | Eubanks | |
| 11,185,684 B2 | 11/2021 | Cadwell | |
| 11,640,204 B2 | 5/2023 | Shenoy et al. | |
| 12,008,987 B2 | 6/2024 | Stavisky et al. | |
| 12,592,721 B2 | 3/2026 | Mermel et al. | |
| 2001/0054758 A1 | 12/2001 | Isaak | |
| 2003/0057506 A1 | 3/2003 | Li et al. | |
| 2005/0228421 A1 | 10/2005 | Bilenski et al. | |
| 2005/0261934 A1 | 11/2005 | Thompson | |
| 2006/0015153 A1 | 1/2006 | Gliner et al. | |
| 2006/0106431 A1 | 5/2006 | Wyler et al. | |
| 2006/0253163 A1 | 11/2006 | Stubbs et al. | |
| 2007/0005691 A1 | 1/2007 | Pushparaj | |
| 2007/0282398 A1 | 12/2007 | Healy et al. | |
| 2009/0028185 A1 | 1/2009 | Doerr et al. | |
| 2009/0082829 A1 | 3/2009 | Panken et al. | |
| 2009/0088763 A1 | 4/2009 | Aram et al. | |
| 2009/0132061 A1 | 5/2009 | Stubbs et al. | |
| 2009/0312817 A1 | 12/2009 | Hogle et al. | |
| 2011/0093052 A1 | 4/2011 | Anderson et al. | |
| 2011/0245835 A1 | 10/2011 | Dodds et al. | |
| 2012/0139269 A1 | 6/2012 | Kouzuma | |
| 2012/0277834 A1 | 11/2012 | Mercanzini et al. | |
| 2012/0302959 A1 | 11/2012 | Fielder et al. | |
| 2013/0014982 A1 | 1/2013 | Segawa et al. | |
| 2013/0108046 A1 | 5/2013 | Andersen | |
| 2013/0144362 A1 | 6/2013 | Lee | |
| 2013/0144365 A1 | 6/2013 | Kipke et al. | |
| 2013/0265180 A1 | 10/2013 | Matsumoto et al. | |
| 2013/0331856 A1 | 12/2013 | Sage | |
| 2014/0044290 A1 | 2/2014 | Pansell et al. | |
| 2014/0051960 A1 | 2/2014 | Badower et al. | |
| 2014/0100586 A1 | 4/2014 | Pianca et al. | |
| 2014/0185805 A1 | 7/2014 | Andersen | |
| 2014/0194944 A1 | 7/2014 | Romanelli et al. | |
| 2015/0111930 A1 | 4/2015 | Aung-Din | |
| 2015/0151114 A1 | 6/2015 | Black et al. | |
| 2015/0265180 A1 | 9/2015 | Venkatesan et al. | |
| 2015/0367122 A1 | 12/2015 | Morshed et al. | |
| 2016/0007874 A1 | 1/2016 | Ma et al. | |
| 2016/0120457 A1 | 5/2016 | Wu et al. | |
| 2016/0174863 A1 | 6/2016 | Foerster et al. | |
| 2016/0331994 A1 | 11/2016 | Smith et al. | |
| 2017/0001003 A1 | 1/2017 | Pivonka et al. | |
| 2017/0100580 A1 | 4/2017 | Olson | |
| 2017/0108926 A1 | 4/2017 | Moon et al. | |
| 2017/0113046 A1 | 4/2017 | Fried et al. | |
| 2017/0224908 A1 | 8/2017 | Hidem et al. | |
| 2017/0224980 A1 | 8/2017 | Grasso et al. | |
| 2017/0235663 A1 | 8/2017 | Kattepur et al. | |
| 2017/0246452 A1 | 8/2017 | Liu et al. | |
| 2017/0259072 A1 | 9/2017 | Newham et al. | |
| 2018/0078767 A1 | 3/2018 | Rapoport et al. | |
| 2018/0236221 A1 | 8/2018 | Opie et al. | |
| 2018/0332009 A1 | 11/2018 | Lange | |
| 2019/0110754 A1 | 4/2019 | Rao et al. | |
| 2019/0134396 A1 | 5/2019 | Toth et al. | |
| 2019/0150774 A1 | 5/2019 | Brinkmann et al. | |
| 2019/0282817 A1 | 9/2019 | Muller et al. | |
| 2019/0333505 A1 | 10/2019 | Stavisky et al. | |
| 2020/0061374 A1 | 2/2020 | Mitchell | |
| 2020/0069427 A1 | 3/2020 | Swennen et al. | |
| 2020/0078586 A1 | 3/2020 | Wijseundara et al. | |
| 2020/0155828 A1 | 5/2020 | Shepard et al. | |
| 2020/0206503 A1 | 7/2020 | Ganzer et al. | |
| 2020/0215318 A1 | 7/2020 | Fielder et al. | |
| 2020/0222010 A1 | 7/2020 | Howard | |
| 2020/0310442 A1 | 10/2020 | Halder et al. | |
| 2020/0337579 A1 | 10/2020 | Auerbach et al. | |
| 2020/0352441 A1 | 11/2020 | Ni et al. | |
| 2020/0364539 A1 | 11/2020 | Anisimov et al. | |
| 2021/0033559 A1 | 2/2021 | Panat et al. | |
| 2021/0034906 A1 | 2/2021 | Van Welzen et al. | |
| 2021/0085988 A1 | 3/2021 | Nin et al. | |
| 2021/0186450 A1 | 6/2021 | Vancamberg et al. | |
| 2021/0213279 A1 | 7/2021 | Rapoport et al. | |
| 2021/0252289 A1 | 8/2021 | Esteller | |
| 2021/0267523 A1 | 9/2021 | Donoghue et al. | |
| 2021/0267526 A1 | 9/2021 | Bishay et al. | |
| 2021/0268265 A1 | 9/2021 | Eder et al. | |
| 2021/0272687 A1 | 9/2021 | Klopfenstein et al. | |
| 2021/0275807 A1 | 9/2021 | Bouton | |
| 2021/0280309 A1 | 9/2021 | Klopfenstein et al. | |
| 2021/0353439 A1 | 11/2021 | Norman et al. | |
| 2022/0005465 A1 | 1/2022 | Prabhavalkar et al. | |
| 2022/0117511 A1 | 4/2022 | Shor et al. | |
| 2022/0175320 A1 | 6/2022 | Shah et al. | |
| 2022/0184403 A1 | 6/2022 | Chouinard et al. | |
| 2022/0208173 A1 | 6/2022 | Chang et al. | |
| 2022/0211312 A1 | 7/2022 | Brinkmann et al. | |
| 2022/0218264 A1 | 7/2022 | Brunner et al. | |
| 2022/0240833 A1 | 8/2022 | Oxley | |
| 2022/0301563 A1 | 9/2022 | Chang et al. | |
| 2022/0370805 A1 | 11/2022 | Cogan et al. | |
| 2022/0379117 A1 | 12/2022 | Spector | |
| 2022/0413612 A1 | 12/2022 | Gribetz | |
| 2023/0059718 A1 | 2/2023 | Hor-Lao et al. | |
| 2023/0062326 A1 | 3/2023 | Colachis et al. | |
| 2023/0111217 A1 | 4/2023 | Weiss | |
| 2023/0113727 A1 | 4/2023 | Van Der Zalm et al. | |
| 2023/0210427 A1 | 7/2023 | Rapoport et al. | |
| 2023/0253104 A1 | 8/2023 | Serruya | |
| 2023/0271007 A1 | 8/2023 | Ganzer et al. | |
| 2023/0320417 A1 | 10/2023 | Renner et al. | |
| 2023/0389851 A1 | 12/2023 | Tal et al. | |
| 2023/0414947 A1 | 12/2023 | Esteller | |
| 2024/0029717 A1 | 1/2024 | Jain et al. | |
| 2024/0115178 A1 | 4/2024 | Rapoport | |
| 2024/0139512 A1 | 5/2024 | Schulhauser et al. | |
| 2024/0374893 A1 | 11/2024 | Robinson et al. | |
| 2024/0399152 A1 | 12/2024 | Powell et al. | |
| 2024/0412030 A1 | 12/2024 | Guinn et al. | |
| 2025/0010070 A1 | 1/2025 | Ganzer et al. | |

FOREIGN PATENT DOCUMENTS

| | | | |
|---|---|---|---|
| CN | 110876652 | A | 3/2020 |
| KR | 20200074951 | A | 6/2020 |
| WO | 2008052166 | A2 | 5/2008 |
| WO | 2012143850 | A1 | 10/2012 |
| WO | 2015191628 | A1 | 12/2015 |
| WO | 2015195553 | A1 | 12/2015 |
| WO | 2017160627 | A2 | 9/2017 |
| WO | 2017196971 | A1 | 11/2017 |
| WO | 2019079475 | A1 | 4/2019 |
| WO | 2019152648 | A1 | 8/2019 |
| WO | 2019211314 | A1 | 11/2019 |
| WO | 2020008016 | A1 | 1/2020 |
| WO | 2020008017 | A1 | 1/2020 |
| WO | 2020142384 | A1 | 7/2020 |
| WO | 2020219371 | A1 | 10/2020 |
| WO | 2021021714 | A1 | 2/2021 |
| WO | 2021055682 | A1 | 3/2021 |
| WO | 2021162795 | A1 | 8/2021 |
| WO | 2021174061 | A1 | 9/2021 |
| WO | 2022011260 | A1 | 1/2022 |

(56) References Cited

FOREIGN PATENT DOCUMENTS

| | | | |
|---|---|---|---|
| WO | 2022126059 | A1 | 6/2022 |
| WO | 2022251151 | A1 | 12/2022 |
| WO | 2024254360 | A1 | 12/2024 |

OTHER PUBLICATIONS

Hettick M., et al., "The Layer 7 Cortical Interface: a Scalable and Minimally Invasive Brain-computer Interface Platform," bioRxiv, Jan. 30, 2024, 42 pages.
International Preliminary Report on Patentability for Application No. PCT/US2022/78130, mailed on Apr. 25, 2024, 8 Pages.
International Preliminary Report on Patentability for the Application No. PCT/US2022/82619, mailed on Jul. 11, 2024, 9 pages.
International Preliminary Report on Patentability for the Application No. PCT/US2023/063894, mailed Sep. 19, 2024, 12 pages.
International Search Report and Written Opinion for Application No. PCT/US2022/078130, mailed on Feb. 16, 2023, 11 pages.
International Search Report and Written Opinion for Application No. PCT/US2022/082619, mailed on Jun. 2, 2023, 16 pages.
International Search Report and Written Opinion for Application No. PCT/US2023/035620 mailed on Feb. 15, 2024, 14 pages.
International Search Report and Written Opinion for Application No. PCT/US2023/035623, mailed on Feb. 8, 2024, 10 pages.
International Search Report and Written Opinion for Application No. PCT/US2023/035624, mailed on Feb. 26, 2024, 15 pages.
International Search Report and Written Opinion for Application No. PCT/US2023/035625, mailed on Feb. 26, 2024, 13 pages.
International Search Report and Written Opinion for Application No. PCT/US2023/035627, mailed on Feb. 9, 2024, 13 pages.
International Search Report and Written Opinion for Application No. PCT/US2023/077626, mailed on Feb. 28, 2024, 12 pages.
International Search Report and Written Opinion for Application No. PCT/US2024/017647, mailed on Jun. 6, 2024, 13 pages.
International Search Report and Written Opinion for Application No. PCT/US2024/028423, mailed on Jul. 18, 2024, 13 pages.
International Search Report and Written Opinion for the application No. PCT/US2023/063894, mailed on Sep. 29, 2023, 14 pages.
Kim T., et al., "Spatiotemporal Compression for Efficient Storage and Transmission of High-Resolution Electrocorticography Data," Annual International Conference of the IEEE Engineering in Medicine and Biology Society, Aug. 28, 2012, pp. 1012-1015.
Liu X., et al., "An Energy-Efficient Compressed Sensing-Based Encryption Scheme for Wireless Neural Recording," IEEE Journal on Emerging and Selected Topics in Circuits and Systems, Jun. 2021, vol. 11, No. 2, pp. 405-414.
Office Action for Canadian Patent Application No. 3241544, mailed Jul. 25, 2024, 3 pages.
Sorrell E., et al., "Brain-machine Interfaces: Closed-loop Control in an Adaptive System," Annual Review of Control, Robotics, and Autonomous Systems, Jan. 29, 2021, vol. 4, pp. 167-189.
Wang N.X.R., et al., "Unsupervised Decoding of Long-Term, Naturalistic Human Neural Recordings with Automated Video and Audio Annotations," Frontiers in Human Neuroscience, Apr. 21, 2016, vol. 10, No. 165, 13 pages.
International Search Report and Written Opinion of the International Searching Authority issued in International Application No. PCT/US2024/043449, 16 pages, dated Nov. 15, 2024.
Alim S.A., et al., "Some Commonly Used Speech Feature Extraction Algorithms," IntechOpen, 2018, vol. 1, 18 pages.
Anumanchipalli G.K., et al., "Speech Synthesis from Neural Decoding of Spoken Sentences," Nature, Apr. 2019, vol. 568, No. 7753, pp. 493-498.
Collobert R., et al., "A Fully Differentiable Beam Search Decoder," A preprint, Feb. 19, 2019, 11 pages.
Defossez A., et al., "Decoding Speech Perception from Non-invasive Brain Recordings," Nature Machine Intelligence, Oct. 5, 2023, vol. 5, pp. 1097-1107.
Duraivel S., et al., "High-resolution Neural Recordings Improve the Accuracy of Speech Decoding," Nature Communications, Nov. 6, 2023, vol. 14, No. 6938, 16 pages.
Haufe S., et al., "Elucidating Relations Between Fmri, Ecog and Eeg Through a Common Natural Stimulus," Publication bioR/iv. Oct. 22, 2017.
Inclusive Technology., "Inclusive Eyegaze Education with Mygaze Eye Tracker—Discontinued," Spectronics, Feb. 25, 2025, 8 pages, Retrieved from the Internet: URL: https://www.spectronics.com.au/product/inclusive-eyegaze-education-with-mygaze-eye-tracker#mygaze.
International Preliminary Report on Patentability for the Application No. PCT/US2023/035620, mailed May 1, 2025, 9 pages.
International Preliminary Report on Patentability for the Application No. PCT/US2023/035623, mailed May 1, 2025, 9 pages.
International Preliminary Report on Patentability for the Application No. PCT/US2023/035624, mailed May 1, 2025, 9 pages.
International Preliminary Report on Patentability for the Application No. PCT/US2023/035625, mailed May 1, 2025, 7 pages.
International Preliminary Report on Patentability for the Application No. PCT/US2023/035627, mailed May 1, 2025, 8 pages.
International Search Report and Written Opinion for Application No. PCT/US2025/011619, mailed on Mar. 27, 2025, 13 Pages.
META., "AI Speech Research Voicebox: Text-guided Multilingual Universal Speech Generation at Scale," Voicebox, Research by Meta AI, 2023, 8 pages, Retrieved on Feb. 25, 2025, Retrieved from the Internet: URL: https://voicebox.metademolab.com/.
International Preliminary Report on Patentability issued in International Application No. PCT/US2023/035620, 9 pages, dated May 1, 2025.
Chen et al, "Emerging Brain-to-Content Technologies From Generative AI and Deep Representation Learning (In the Spotlight)", IEEE Signal Processing Magazine, vol. 41, No. 6, pp. 94-104, Nov. 2024.
Beck C., et al., "Block Cipher Based Security for Severely Resource-Constrained Implantable Medical Devices," In Proceedings of the 4th International Symposium on Applied Sciences in Biomedical and Communication Technologies (ISABEL '11) Association for Computing Machinery, Oct. 26, 2011, No. 62, pp. 1-5.
Bridges D.C., et al., "MEA Viewer: a High-performance Interactive Application for Visualizing Electrophysiological Data," PLoS ONE, Feb. 9, 2018, vol. 12, No. 2, 10 pages.
Daemen J., et al., "AES Proposal: Rijndael," National Institute of Standards and Technology, 1999, 47 pages.
Judy M., et al., "A Nonlinear Signal-Specific ADC for Efficient Neural Recording," Biomedical Circuits and Systems Conference (BioCAS), 2010, pp. 17-20.
Kester Q.A., "A Cryptographic Image Encryption Technique for Facial-Blurring of Images," International Journal of Advanced Technology & Engineering Research, May 2013, vol. 3, No. 3, pp. 1-7.
Maji S., et al., "A Low-power Dual-Factor Authentication Unit for Secure Implantable Devices" IEEE Custom Integrated Circuits Conference (CICC), 2020, 10 pages, Retrieved from the Internet URL: https://arxiv.org/pdf/2004.13709.
Matsushita K., et al., "A Fully Implantable Wireless ECoG 128-Channel Recording Device for Human Brain-machine Interfaces: W-HERBS," Frontiers in Neuroscience, Jul. 30, 2018, vol. 12, No. 511, 11 pages.
Ogawa H., et al., "Rapid and Minimum Invasive Functional Brain Mapping by Real-time Visualization of High Gamma Activity During Awake Craniotomy," World Neurosurgery, Nov. 2014, 10 pages.
Pallud J., et al., Direct Electrical Bipolar Electrostimulation for Functional Cortical and Subcortical Cerebral Mapping in Awake Craniotomy. Practical Considerations, Neurochirurgie, Jun. 1, 2017, vol. 63, pp. 164-174.
Schneier B., "Description of a New Variable-Length Key, 64-Bit Block Cipher (Blowfish)," Fast Software Encryption, Cambridge Security Workshop Proceedings, Dec. 1993, pp. 191-204.
Tchoe Y., et al., "Human Brain Mapping with Multi-thousand Channel PtNRGrids Resolves Spatiotemporal Dynamics," Science Translational Medicine, Jan. 19, 2022, vol. 14, No. 628, 22 pages.

(56) References Cited

OTHER PUBLICATIONS

Third Party Prior Art Submission for U.S. Appl. No. 18/180,248, filed Aug. 12, 2025.
Thorpe C., et al., "A Coprime Blur Scheme for Data Security in Video Surveillance," In IEEE Transactions on Pattern Analysis and Machine Intelligence, 2013, vol. 35, No. 12, pp. 3066-3072.
Uy J., et al., "Stability of Maps of Human Motor Cortex Made with Transcranial Magnetic Stimulation," Brain Topography, Jun. 2002, vol. 14, No. 4, pp. 293-297.
Biederman W., et al., "A Fully-Integrated, Miniaturized (0.125 mm2) 10.5 µW Wireless Neural Sensor," IEEE Journal of Solid-state Circuits, 2013, vol. 48, No. 4, pp. 960-970.
Coelho K., et al., "Cryptographic Algorithms in Wearable Communications: an Empirical Analysis," IEEE Communications Letters, 2019, vol. 23, No. 11, pp. 1931-1934.
Examination Report No. 1 for Australian Patent Application No. 2023230897 dated Jun. 26, 2025, 10 pages.
Ghoreishizadeh S.S., et al., "A Lightweight Cryptographic System for Implantable Biosensors," Proceedings of 2014 IEEE Biomedical Circuits and Systems Conference (BioCAS), 2014, pp. 472-475.
Hinterberger T., et al., "Voluntary Brain Regulation and Communication with Electrocorticogram Signals," Epilepsy and Behavior, Aug. 1, 2008, vol. 13, No. 2, pp. 300-306.
International Search Report and Written Opinion for Application No. PCT/US2025/019165, mailed on Jun. 6, 2025, 18 pages.
Kim H., et al., "A Configurable and Low-Power Mixed Signal SoC for Portable ECG Monitoring Applications," IEEE Transactions on Biomedical Circuits and Systems, 2014, vol. 8, No. 2, pp. 257-267.
Schwemmer M.A., et al., "Meeting Brain-Computer Interface User Performance Expectations Using a Deep Neural Network Decoding Framework," Nature Medicine, Sep. 24, 2018, vol. 24, No. 11, pp. 1669-1676.
Yanagisawa T., et al., "Electrocorticographic Control of a Prosthetic Arm in Paralyzed Patients," Annals of Neurology, 2012, vol. 71, No. 3, pp. 353-361.
Escabi M.A., et al., "A high-density, high-channel count, multiplexed muECoG array for auditory-cortex recordings" Journal of Neurophysiology, 2014, vol. 112, No. 6, pp. 1566-1583.
Office Action for Canadian Patent Application No. 3,245,576, mailed Oct. 14, 2025, 5 pages.
Rohaut B., et al., "Uncovering Consciousness in Unresponsive ICU Patients: Technical, Medical and Ethical Considerations," Critical Care, Mar. 9, 2019, vol. 23, No. 78, 9 pages, doi:10.1186/s13054-019-2370-4.
"What are polymides?", UBE Corporation, accessed on Sep. 19, 2025, accessed at https://www.ube.com/ube/en/contents/chemical/ploymide/ploymide_column.html (Year: 2025).
International Preliminary Report on Patentability for Application No. PCT/US2024/043449, mailed Mar. 5, 2026, 09 pages.
Office Action for Canadian Patent Application No. 3,269,407, mailed Mar. 6, 2026 , 5 pages.
Examination Report No. 2 for Australian Patent Application No. 2023230897 dated Jun. 15, 2026, 4 pages.
Examination Report for Indian Patent Application No. 202517089434, dated May 14, 2026, 7 Pages.
Lin., et al., "Symmetric cryptography with a chaotic map and a multilayer machine learning network for Physiological Signal Infosecurity: Case Study in Electrocardiogram," IEEE Access, 9, 2021, 17 pages.

* cited by examiner

700

WIRELESS IMPLANT SYSTEM EMERGENCY SHUTDOWN

CROSS-REFERENCE TO RELATED APPLICATIONS

The present application claims priority to U.S. Provisional Patent Application No. 63/533,965, titled WIRELESS IMPLANT SYSTEM EMERGENCY SHUTDOWN, filed Aug. 22, 2023, which is hereby incorporated by reference herein in its entirety.

TECHNICAL FIELD

Embodiments disclosed herein generally relate to a system and method of protecting the health of a user and the user's physiological data from unauthorized access by a third party during an implant's operation. Based on the unauthorized access, an emergency shutdown can be performed such that an implant in the user is deactivated.

BACKGROUND

Brain-computer interfaces have shown promise as systems for restoring, replacing, and augmenting lost or impaired neurological function in a variety of contexts, including paralysis from stroke and spinal cord injury, blindness, and some forms of cognitive impairment. Multiple innovations over the past several decades have contributed to the potential of these neural interfaces, including advances in the areas of applied neuroscience and multichannel electrophysiology, mathematical and computational approaches to neural decoding, power-efficient custom electronics and the development of application-specific integrated circuits, as well as materials science and device packaging. Nevertheless, the practical impact of such systems remains limited, with only a small number of patients worldwide having received highly customized interfaces through clinical trials.

High bandwidth brain-computer interfaces are being developed to enable the bidirectional communication between the nervous system and external computer systems in order to assist, augment, or replace neurological function lost to disease or injury. A necessary capability of any brain-computer interface is the ability to accurately decode electrophysiologic signals recorded from individual neurons, or populations of neurons, and correlate such activity with one or more sensory stimuli or intended motor response. For example, such a system can record activity from the primary motor cortex in an animal or a paralyzed human patient and attempt to predict the actual or intended movement in a specific body part; or the system can record activity from the visual cortex and attempt to predict both the location and nature of the stimuli present in the patient's visual field.

Furthermore, brain-penetrating microelectrode arrays have facilitated high-spatial-resolution recordings for brain-computer interfaces, but at the cost of invasiveness and tissue damage that scale with the number of implanted electrodes. In some applications, softer electrodes have been used in brain-penetrating microelectrode arrays; however, it is not yet clear whether such approaches offer a substantially different tradeoff as compared to conventional brain-penetrating electrodes. For this reason, non-penetrating cortical surface microelectrodes represent a potentially attractive alternative and form the basis of the system described here. In practice, electrocorticography (ECoG) has already facilitated capture of high quality signals for effective use in brain-computer interfaces in several applications, including motor and speech neural prostheses. Higher-spatial-resolution micro-electrocorticography (μECoG) therefore represents a promising combination of minimal invasiveness and improved signal quality. Therefore, it would be highly beneficial for neural devices to make use of non-penetrating cortical interfaces.

However, the benefits of neural devices can come at a cost. In rare circumstances a device may malfunction, and it is important that such a malfunction be detected automatically and in a timely fashion, and that the device have built-in processes for ensuring that such a malfunction does not harm the patient in whom the device is implanted. Additionally, data breaches and hacking are on the rise as advances in technology are made and neural devices are not immune to such acts. Emergency provisions or acts to prevent such acts are desirable to protect patients in the long term.

SUMMARY

The present disclosure is directed to a system and method of protecting the health of a user and the user's physiological data from unauthorized access by a third party during an implant's operation. Based on a detected change in an internal device state, or the detection of unauthorized access, emergency shutdown or other protective modes can be performed such that an implant in the user is deactivated or otherwise placed in a safe operating mode.

In one embodiment, the present disclosure is directed to an electronically implemented method for controlling a neural device in an implanted system in a subject, the method comprising: monitoring, by a monitoring device, the neural device; detecting, by the monitoring device, a condition associated with the neural device; and based on the condition detected by the monitoring device, changing an operating state of the neural device to avoid injury to the subject or to avoid transmission of private data.

In one embodiment, the present disclosure is directed to a system, comprising: a neural device for implantation in a subject; a monitoring device; one or more memories; and at least one processor each coupled to at least one of the one or more memories, the at least one processor configured to perform operations comprising: monitor, by the monitoring device, the neural device; detect, by the monitoring device, a condition within the neural device; and based on the condition detected by the monitoring device, changing an operating state of the neural device to avoid injury to the subject or to avoid transmission of private data.

In one embodiment, the present disclosure is directed to a non-transitory computer-readable medium having instructions stored thereon that, when executed by at least one computing device, cause the at least one computing device to perform operations for controlling a neural device in an implanted system in a subject, the operations comprising: monitoring, by a monitoring device, a neural device; detecting, by the monitoring device, a condition within the neural device; and based on the condition detected by the monitoring device, changing an operating state of the neural device to avoid injury to the subject or to avoid transmission of private data.

In some embodiments, changing the operating state of the neural device further comprises: deactivating the neural device.

In some embodiments, deactivating the neural device further comprises: disconnecting a battery power path in the neural device.

In some embodiments, monitoring the neural device further comprises: measuring one or more of an electrode impedance, a main supply voltage, or an internal reference voltages of the neural device.

In some embodiments, monitoring the neural device further comprises: checking internal battery reserve energy of the neural device.

In some embodiments, monitoring the neural device further comprises: servicing a watchdog timer of the neural device.

In some embodiments, monitoring the neural device further comprises: checking data blocks of the neural device.

In some embodiments, monitoring the neural device further comprises: detecting a tapping sequence of an accelerometer of the neural device.

In some embodiments, changing the operation state of the neural device further comprises: clearing wireless connections of the neural device.

In some embodiments, the condition is at least one of a circuit failure of the neural device, a memory corruption of the neural device, or an active component failure of the neural device.

In some embodiments, the circuit failure of the neural device can be caused by an electrical short.

In some embodiments, the memory corruption of the neural device can occur in low-power static memory or in non-volatile memory.

In some embodiments, the active component failure can be caused by electrostatic discharge (ESD).

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

The present disclosure is directed a system and method of protecting the health of a user and the user's physiological data from unauthorized access by a third party during an implant's operation. Based on the unauthorized access, an emergency shutdown can be performed such that an implant in the user is deactivated.

Neural Device Systems

Figure 1:
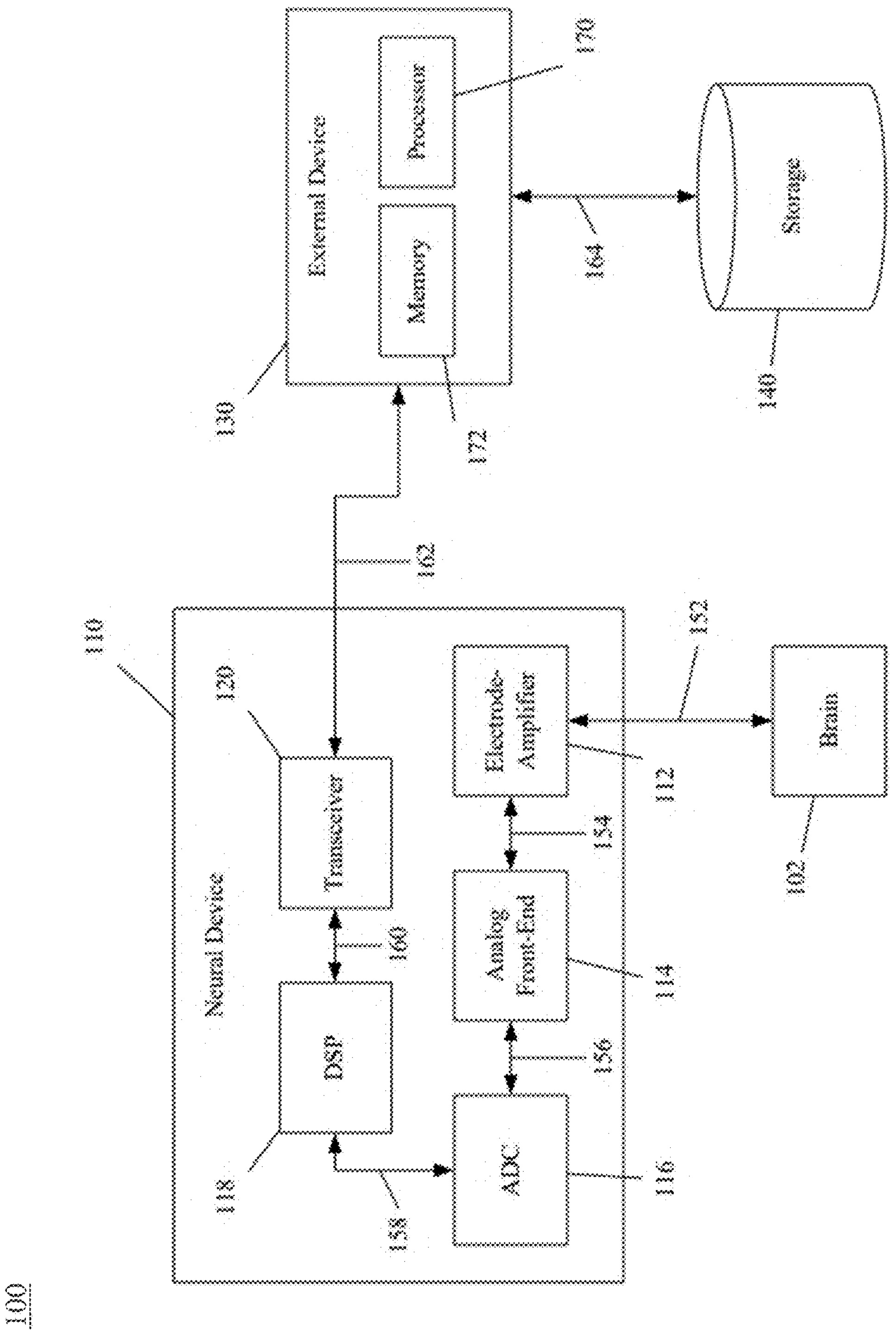
FIG. 1 illustrates a block diagram of a secure neural device data transfer system, according to an embodiment of the present disclosure.

Conventional neural devices typically include electrode arrays that penetrate a user's brain in order to sense and/or stimulate the brain. However, the present disclosure is directed to the use of non-penetrating neural devices, i.e., neural devices having electrode arrays that do not penetrate the cortical surface. Such non-penetrating neural devices are minimally invasive and minimize the amount of impact on the user's cortical tissue. Neural devices can sense and record brain activity, receive instructions for stimulating the user's brain, and otherwise interact with a user's brain as generally described herein. Referring now to FIG. 1, there is shown a diagram of an illustrative system 100 including a neural device 110 that is communicatively coupled to an external device 130. The external device 130 can include any device that the neural device 110 can be communicatively coupled, such as a computer system or mobile device (e.g., a tablet, a smartphone, a laptop, a desktop, a secure server, a smartwatch, a head-mounted virtual reality device, a head-mounted augmented reality device, or a smart inductive charger device). The external device 130 can include a processor 170 and a memory 172. In some embodiments, the computer system 102 can include a server or a cloud-based computing system. In some embodiments, the external device 130 can further include or be communicatively coupled to storage 140. In one embodiment, the storage 140 can include a database stored on the external device 130. In another embodiment, the storage 140 can include a cloud computing system (e.g., Amazon Web Services or Azure).

The neural device 110 can include a range of electrical or electronic components. In the illustrated embodiment, the neural device 110 includes an electrode-amplifier stage 112, an analog front-end stage 114, an analog-to-digital converter (ADC) stage 116, a digital signal processing (DSP) stage 118, and a transceiver stage 120 that are communicatively coupled together. The electrode-amplifier stage 112 can include an electrode array, such as is described below, that is able to physically interface with the brain 102 of the user in order to sense brain signals and/or apply electrical signals thereto. The analog front-end stage 114 can be configured to amplify signals that are sensed from or applied to the brain 102, perform conditioning of the sensed or applied analog signals, perform analog filtering, and so on. The front-end stage 114 can include, for example, one or more application-specific integrated circuits (ASICs) or other electronics, such as the ADC stage 116. The ADC stage 116 can be configured to convert received analog signals to digital signals and/or convert received digital signals to an analog signal to be processed via the analog front-end stage 114 and then applied via the electrode-amplifier stage 112. The DSP stage 118 can be configured to perform various DSP techniques, including multiplexing of digital signals and/or reducing the data rate by performing a feature extraction of or data compression of the digitized signals received via the electrode-amplifier stage 112 and/or from the external device 130. For example, the DSP stage 118 can be configured to convert instructions from the external device 130 to a corresponding digital signal. The transceiver stage 120 can be configured to transfer data from the neural device 110 to the external device 130 located outside of the body of the user 102.

In various embodiments, the stages of the neural device 110 can provide unidirectional or bidirectional communications in half- or full-duplex mode (as indicated in FIG. 1) by and between the neural device 110 and the external device 130. In various embodiments, one or more of the stages can operate in a serial or parallel manner with other stages of the system 100. It can further be noted that the depicted architecture for the system 100 is simply intended for illustrative purposes and that the system 100 can be arranged differently (i.e., components or stages can be connected in different manners) or include additional components or stages.

Figure 2:
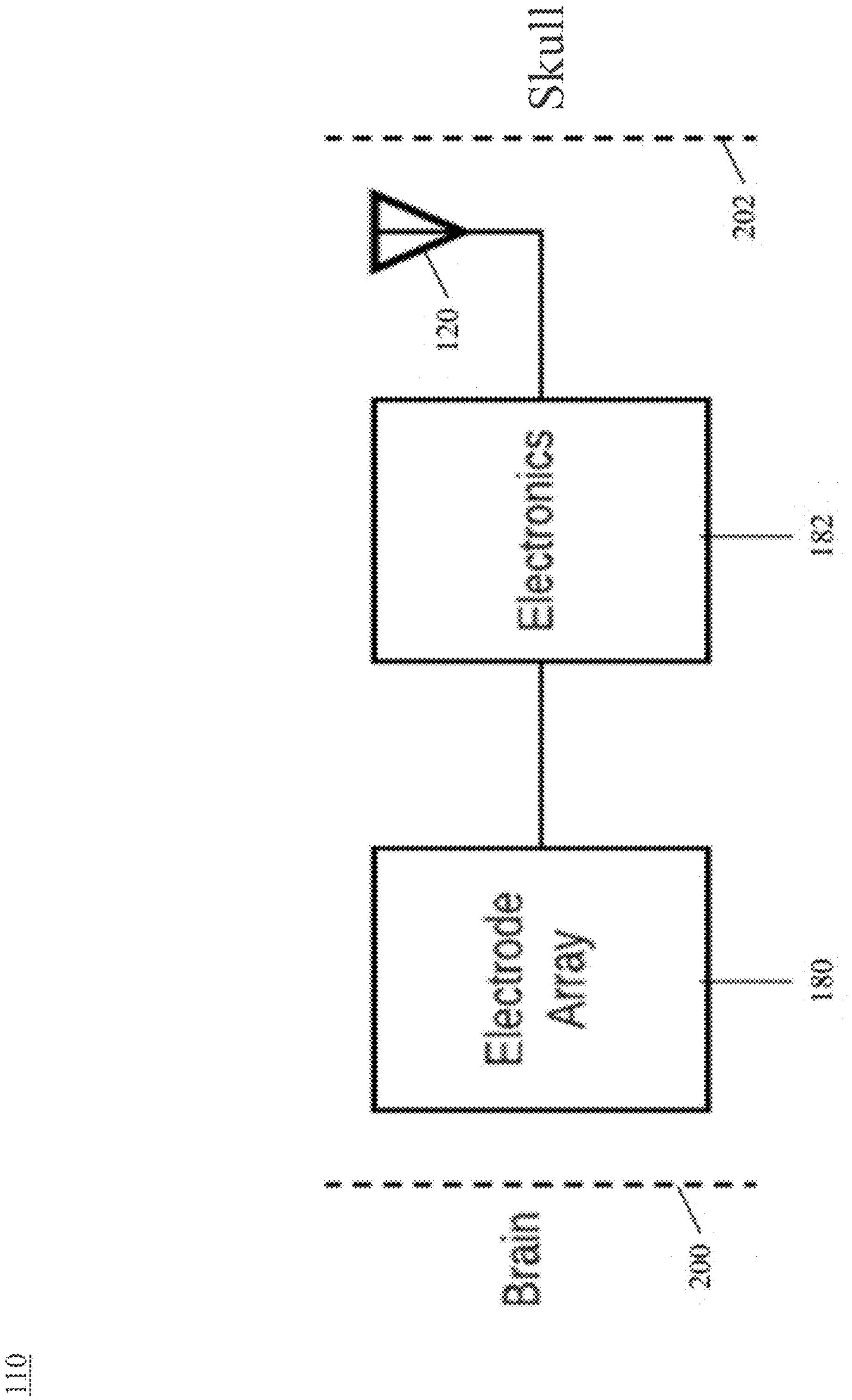
FIG. 2 illustrates a diagram of a neural device, according to an embodiment of the present disclosure.

In some embodiments, the neural device 110 described above can include a brain implant, such as is shown in FIG. 2. The neural device 110 can be a biomedical device configured to study, investigate, diagnose, treat, and/or augment brain activity. In some embodiments, the neural device 110 can be positioned between the brain 200 and the skull 202. The neural device 110 can include an electrode array 180 (which can be a component of or coupled to the electrode-amplifier stage 112 described above) that is configured to record and/or stimulate an area of the brain 200. The electrode array 180 can be connected to an electronics hub 182 (which can include one or more of the electrode-amplifier stage 112, analog front-end stage 114, ADC stage 116, and DSP stage 118) that is configured to transmit via wireless or wired transceiver 120 to the external device 120 (in some cases, referred to as a "receiver").

The electrode array 180 can include non-penetrating cortical surface microelectrodes (i.e., the electrode array 180 does not penetrate the brain 200). Accordingly, the neural device 110 can provide a high spatial-resolution, with minimal invasiveness and improved signal quality. The minimal invasiveness of the electrode array 180 is beneficial because it allows the neural device 110 to be used with larger population of patients than conventional brain implants, thereby expanding the application of the neural device 110 and allowing more individuals to benefit from brain-computer interface technologies. Furthermore, the surgical procedures for implanting the neural devices 110 are minimally invasive, reversible, and avoid damaging neural tissue. In some embodiments, the electrode array 180 can be a high-density microelectrode array that provides smaller features and improved spatial resolution relative to conventional neural implants.

In some embodiments, the neural device 110 includes an electrode array configured to stimulate or record from neural tissue adjacent to the electrode array, and an integrated circuit in electrical communication with the electrode array, the integrated circuit having an analog-to-digital converter (ADC) producing digitized electrical signal output. In some embodiments, the ADC or other electronic components of the neural device 110 can include an encryption module, such as is described below. The neural device 110 can also include a wireless transmitter (e.g., the transceiver 120) communicatively coupled to the integrated circuit or the encryption module and an external device 130. The neural device 110 can also include, for example, control logic for operating the integrated circuit or electrode array 180, memory for storing recordings from the electrode array, and a power management unit for providing power to the integrated circuit or electrode array 180.

Figure 3:
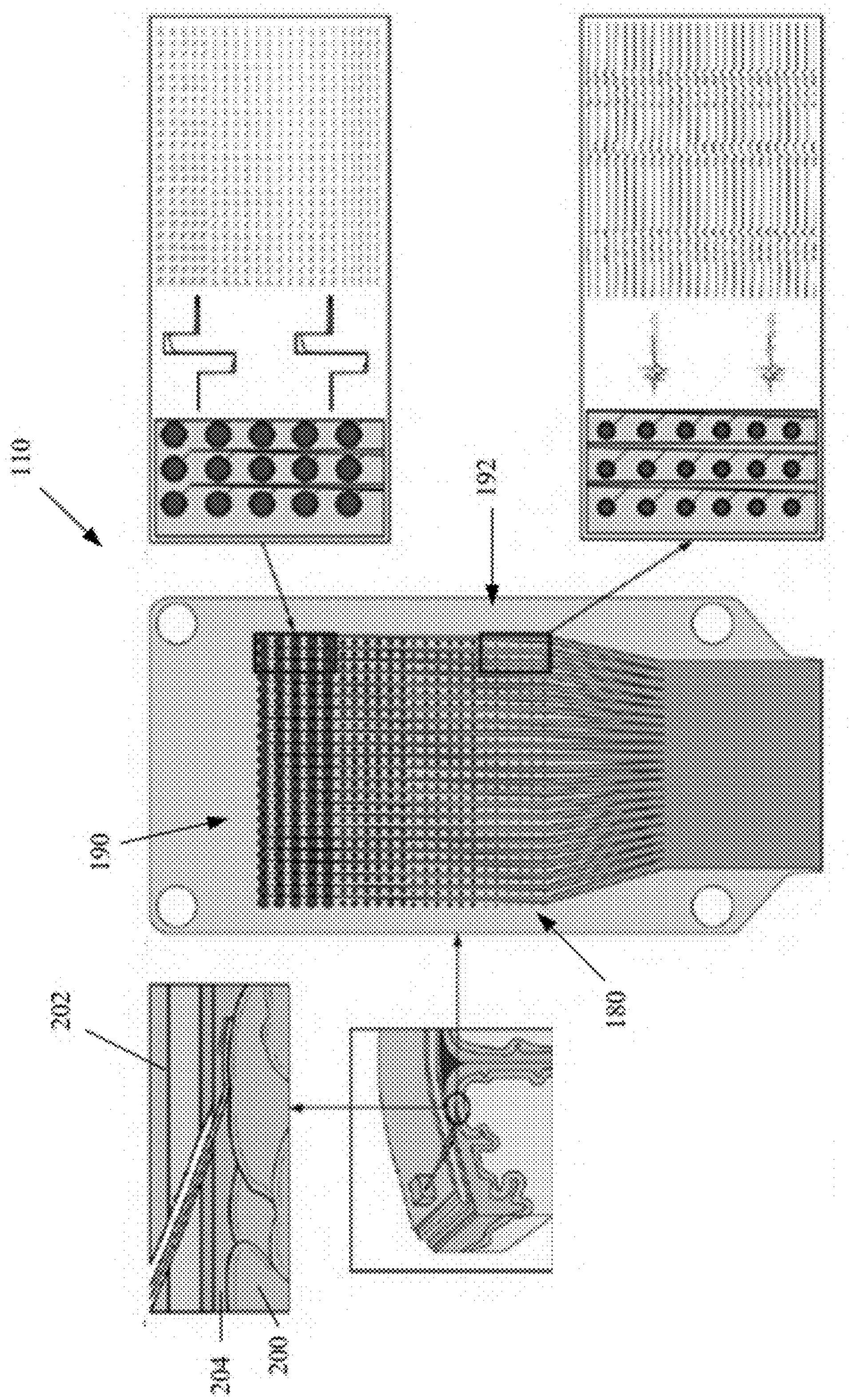
FIG. 3 illustrates a diagram of a thin-film, microelectrode array neural device and implantation method, according to an embodiment of the present disclosure.

Referring now to FIG. 3, a diagram of an illustrative embodiment of a neural device 110 is shown. In this embodiment, the neural device 110 includes an electrode array 180 including non-penetrating microelectrodes. As generally described above, the neural device 110 can be configured for minimally invasive subdural implantation using a cranial micro-slit technique, i.e., is inserted into the subdural space 204 between a patient's skull 202 and brain 200. Further, the microelectrodes of the electrode array 180 can be arranged in a variety of different configurations and can vary in size. In this particular example, the electrode array 180 includes a first group 190 of electrodes (e.g., 200 μm microelectrodes) and a second group 192 of electrodes (e.g., 20 μm microelectrodes). Further, example stimulation waveforms in connection with the first group 190 of electrodes and the resulting post-stimulus activity recorded over the entire array is depicted for illustrative purposes. Still further, example traces from recorded neural activity recorded by the second group 192 of electrodes are likewise illustrated. In this example, the electrode array 180 provides multichannel data that can be used in a variety of electrophysiologic paradigms to perform neural recording of both spontaneous and stimulus-evoked neural activity as well as decoding and focal stimulation of neural activity across a variety of functional brain regions.

Additional information regarding brain-computer interfaces described herein can be found in Ho et al, *The Layer 7 Cortical Interface: A Scalable and Minimally Invasive Brain Computer Interface Platform*, bioRxiv 2022.01.02.474656; doi: https://doi.org/10.1101/2022.01.02.474656, which is hereby incorporated by reference herein in its entirety.

Emergency Shutdown System

One major issue facing neural device systems, such as the system 100 described above in connection with FIG. 1, is that the implant can fail and become dangerous to the user. Therefore, it would be advantageous if the system 100, particularly the neural device 110, can implement an emergency shutdown or other safe operating mode in response to certain detected conditions in order to protect the user and the user data. In some embodiments, the system 100 can be designed to change an operating state of the neural device 110 to avoid injury to the subject or to avoid transmission of private data, as described in greater detail below. In order to change the operating state of the neural device 110, the neural device 110 can include a monitoring system 420, as depicted in FIG. 4, that is programmed or other configured to monitor for one or more conditions and shutdown the neural device 110 or place it in a safe mode of operation in response thereto.

Figure 4:
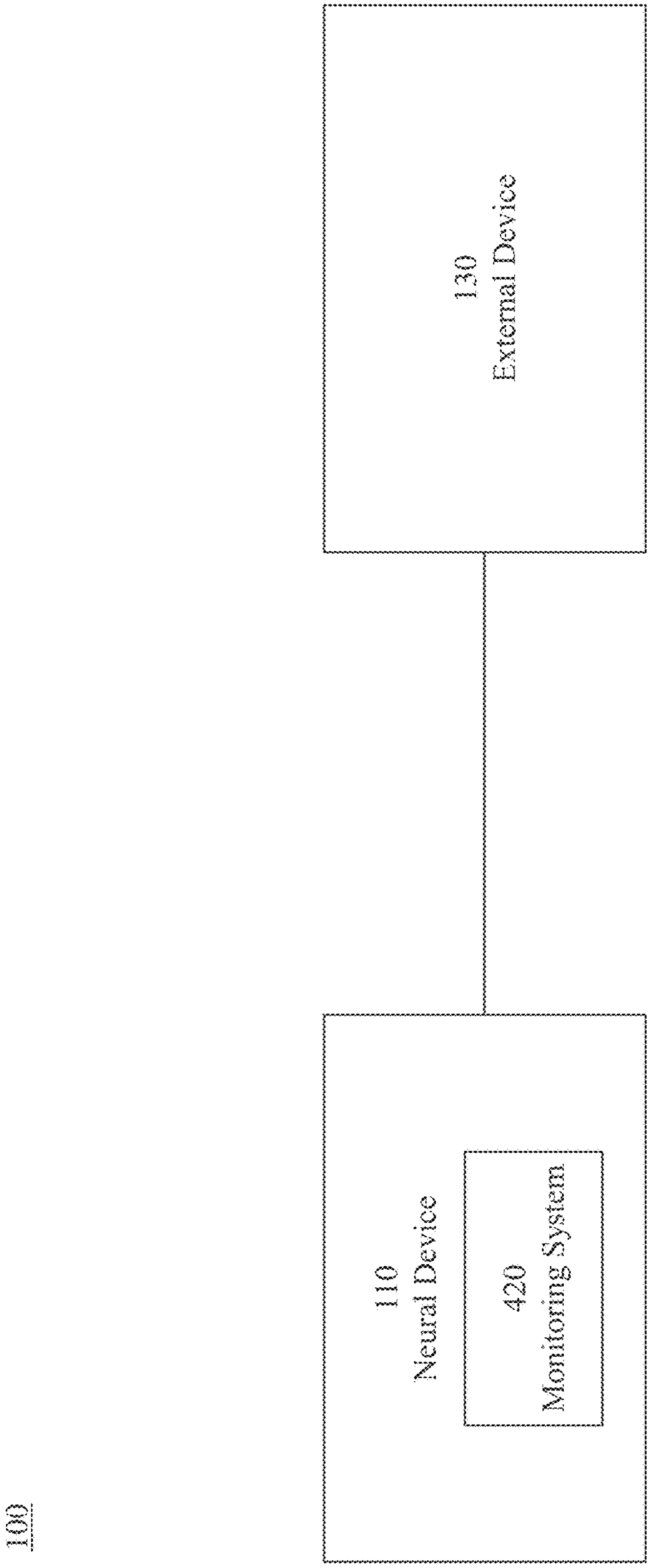
FIG. 4 illustrates a system with a monitoring device that monitors a neural device, according to an embodiment of the present disclosure.

FIG. 4 illustrates one embodiment of the system 100 where the neural device 110 includes a monitoring system 420 that monitors the neural device 110. In system 100, the monitoring system 420 monitors for the occurrence of certain conditions exhibited by or associated with the neural device 110. Depending on the conditions monitored, if desired, the monitoring system 420 can perform an emergency shutdown of the neural device 110. Various examples of such hazardous conditions that necessitate that the neural device 110 undergo an emergency shutdown procedure are described herein.

As previously described, neural device 110 can include an implant. The monitoring system 420 can periodically measure the implant's main variables, which can include but are not limited to, temperature, voltages and currents, or health checks. The health check can refer to evaluating the data integrity of the internal volatile and non-volatile digital data. A supervisor of the monitoring system 420 can acknowledge the system health by periodically resetting a digital counter, such as a heartbeat generator or a watchdog. If there is not periodical reset, the implant's energy source can disconnect unconditionally. However, in the case of a diagnosed safety related failure, which can be hazardous to the user, the implant can be forced the energy source to disconnect.

Under certain diagnosed safety related failures, certain external and/or internal events can cause the hardware, embedded firmware, and/or software of the implant to become damaged or degraded in a manner that can be hazardous to the user. Further, it may be desirable to implement safety measures to ensure that the user's physiological data is protected from unauthorized access from a third party. In one embodiment, the neural device 110 can be designed to implement an emergency shutdown procedure in response to one such hazardous condition being detected in order to maintain user safety and protect user physiological data.

The monitoring system 420 can be designed to monitor for a variety of different hazardous conditions. Such hazardous conditions can include, but are not limited to, implant temperature, circuit failure, program or data memory corruption, active component failure, or the like. In order to monitor for these or other hazardous conditions, the monitoring system 420 can monitor at least one of, but is not limited to, measuring electrode impedance, main supply voltage, and internal reference voltages of the neural device 110; checking internal battery reserve energy of the neural device 110; servicing a watchdog timer of the neural device 110; checking data blocks of the neural device 110; detecting a tapping sequence of an accelerometer of the neural device 110; or checking for unauthorized data requests of the neural device 110.

Implant temperature, for example, can be due to the implant temperature becoming too high while inserted. The implant's temperature can be monitored constantly by the monitoring system 420. The implant operation can automatically terminate if the temperature approaches an upper limit (e.g., 2° C.) above a threshold temperature (e.g., typical body temperature of 37° C.).

Circuit failure, for example, can be due to a mechanical impact. The circuit failure can occur in the electronics of the implant. The circuit failure can be caused by an electrical short or an open in a passive or active component in the implant's electronics. A direct mechanical impact on the implant can apply stress to the interconnecting joints, metallized surfaces, or the component terminals.

Program or data memory corruption can be caused by a single event upset in the low-power state memory (SRAM) or in the non-volatile memory (flash). This single event can be caused by high-energy particles, for example, when the user is situated at a high altitude. An unintentional data corruption of critical data can occur, where the critical data can be stored in the implant's non-volatile memory (e.g., EEPROM, flash memory, or the like). This can occur when the implant's main voltage supply is interrupted at the same time a block of data is being written into the memory. This can also occur before the error protecting data, also known as a forward error correction, has been written into the same memory device.

Active component failure can be caused by electrostatic discharge (ESD). ESD is the release of static electricity when two objects come into contact. ESD can be generated by, for example, walking on carpet, pulling clothes over the or near the implant side, playing on a plastic slide in a park, or being in proximity to cathode ray tubes (e.g., computer monitors or TVs). With the described neural device 110, ESD can be caused when voltage is applied to the silicon device, which can overstress the neural device 110. When the voltage is applied, for example to the overall system 100, the ESD can be latent such that it is unnoticed. The charge might be small or near the immunity threshold and not noticed in time In some embodiments, the silicon device can refer to a switch used during shutdown. The switch can be a PMOS power switch that is controlled from a supervising microcontroller. When in normal conditions, the switch can connect the power source to the electronics of the implant. When the switch is in a triggered hazardous condition, the switch can disconnect the power source. The switch can then reconnect the power source when the implant is being charged wirelessly.

As generally described above, the neural device 110 include wireless communication capabilities, i.e., it is capable of wirelessly communicating with an external device 130. Wireless communication represents a potential source of security risks because hostile actors can intercept and/or record the wirelessly communicated data. The risk can become greater when the user is in the wide open or in a non-medical isolated environment. In this environment, the implant is no longer considered as "invisible," which means its presence can be remotely detected using typical wireless protocol analyzers, such as a commercial sniffer, software radio, or the like. This listening can result in a security or privacy breach since the implant handles a variety of different personal data, such as the user's electrophysiological signals. These signals can encode the user's thoughts and/or intentions.

In some embodiments, the neural device 110 can implement one or more supervising methods and/or systems to detect one or more of the hazardous conditions described above. In one embodiment, the supervising methods and/or systems can include measuring and recording electrode impedances, main supply voltages, internal reference voltages, and/or other electrical measurements.

In one embodiment, the supervising methods and/or systems can include monitoring the internal battery reserve energy, also referred to as state of charge (SOC), and termination of the implant's operation to prevent incomplete block data transfers into the non-volatile memory, periodic servicing of a watchdog timer that includes implant electronics firmware, protection of program and data memories, periodical checks of data integrity in data blocks that can contain critical programs or sensitive user data, sensing a specific tapping sequence that is detectable through the in-built accelerometer and may indicate a user-initiated emergency shut-down, or logging of potential un-authorized data requests or persistent channel blocking in BT communication, but are not be limited to those described herein.

If the hazardous condition is indeed detected by the monitoring system 420, the hardware of the implant can release and permanently clear all wireless connections that can be paired or bonded. This means all connections are broken and would have to be reestablished. This reestablishment ensures that only trustworthy devices are paired to the system 100, and ultimately the neural device 110. The system can deactivate the implant platform, such as the neural device, by disconnecting the primary power source, such as the battery, from the power management to effectively terminate all active implant operation. This termination can be referred to as an emergency shutdown. Alternatively, rather than complete shut-down, the implant can enter other protective modes designed to ensure safe operation without shutting down.

The monitoring system 420 can be programmed or otherwise configured to detect the occurrence of any of the hazardous conditions described above. In the event that the monitoring system 420 detects the occurrence of the hazardous condition, the monitoring system 420 can either shutdown the system 100 immediately or provide a sequence shutdown of the system 100. The immediate shutdown can include, but is not limited to, disconnecting the power source or the like.

Once the emergency shutdown or safe operating mode has been triggered by the monitoring system 420, the operability of the neural device 110 can be reinitiated through a controlled and secure start-up sequence. This sequence can involve the application of wireless power and the re-authentication of the secure keys between the host, such as an authorized pod and implant, which can be secured again.

In one embodiment, the monitoring system 420 can be configured to implement the emergency shutdown of the neural device's 110 electronics via a switch (e.g., a silicon switch). The switch can disconnect the main battery's power path, which is the primary energy supply source in the implant system. In one embodiment, the switch can include a field-effect-transistor (FET). The FET can be typically in the on state, which allows for supply current to flow between the battery and the down-stream voltage regulators that supply the various analog and digital blocks of the electronics. The silicon switch has a voltage-level sensitive input that is a latch type switch. The silicon switch can be forced by the platform microcontroller (MCU) to rise above the transistor's switching threshold it is put into a permanent off state. In the off-state mode, all system components are unpowered, which keeps the platform in an idle or inactive state. When the implant's battery is disconnected, which is referred to as the off-state mode, can be maintained until the implantable system is reenergized from an external RF power signal.

Figure 5:
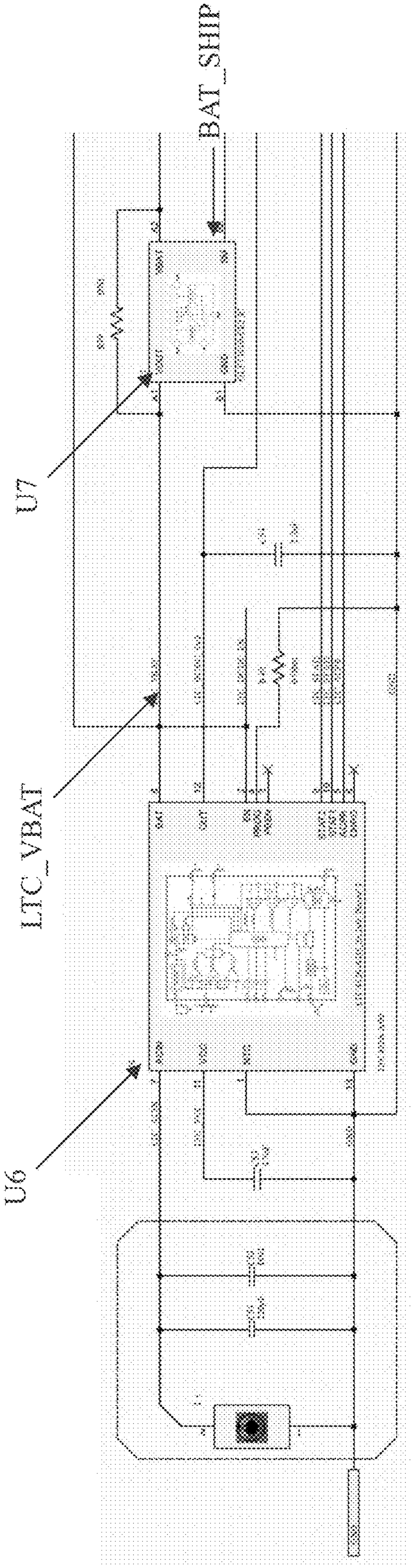
FIG. 5 illustrates the electrical circuits that implement the implant's power path and emergency disconnection, according to an embodiment of the present disclosure.

FIG. 5 illustrates the electrical circuits that implement the implant's power path and emergency disconnection, according to some embodiments. The electrical circuit described herein serves as an illustrative embodiment and others similar electrical circuits can also be implemented.

In the circuit diagram shown in FIG. 5, U6 is an RF rectifier and battery charging IC that can receive AC power from the LC circuit. U6 can supply the battery with a constant current during battery charging. The supply to and from the battery can propagate through U7, which can be a bi-directional FET with a triggerable input that disconnects the path between the charger, the electrical subsystem (e.g., the load), and the battery itself.

In the event of an emergency, the platform MCU can assert the level sensitive input BAT_SHIP, which can force the switch to open and the connection path, which can become high impedance. Once the switch is in the off-state mode, the switch can only be released when the implant's rectifier U6 re-energizes the switch's supply input LTC_VBAT with a DC voltage of greater than 4.0V. The energizing supply can be provided by the implant's system's external wireless power transmission circuit, which can be embedded into the companion device, often referred to as a pod.

Mitigation of the ESD induced damage is in integrated circuits using functional hardening to levels approximation in human or machine models to determine the required immunity level to ESD events. The final assembly of the implantable system can undergo direct ESD testing to demonstrate compliance to regulatory certification limits in relation to exposure to ESD events in normal usc.

In order to discover if one of the hazardous conditions described herein has occurred, monitoring can be performed. For example, the monitoring may be performed by the monitoring system 420. If one of the hazardous conditions are detected, the implant can be deactivated or shutdown in response to the hazardous condition. Specifically, the method of such deactivation can be described in FIG. 5.

Figure 6:
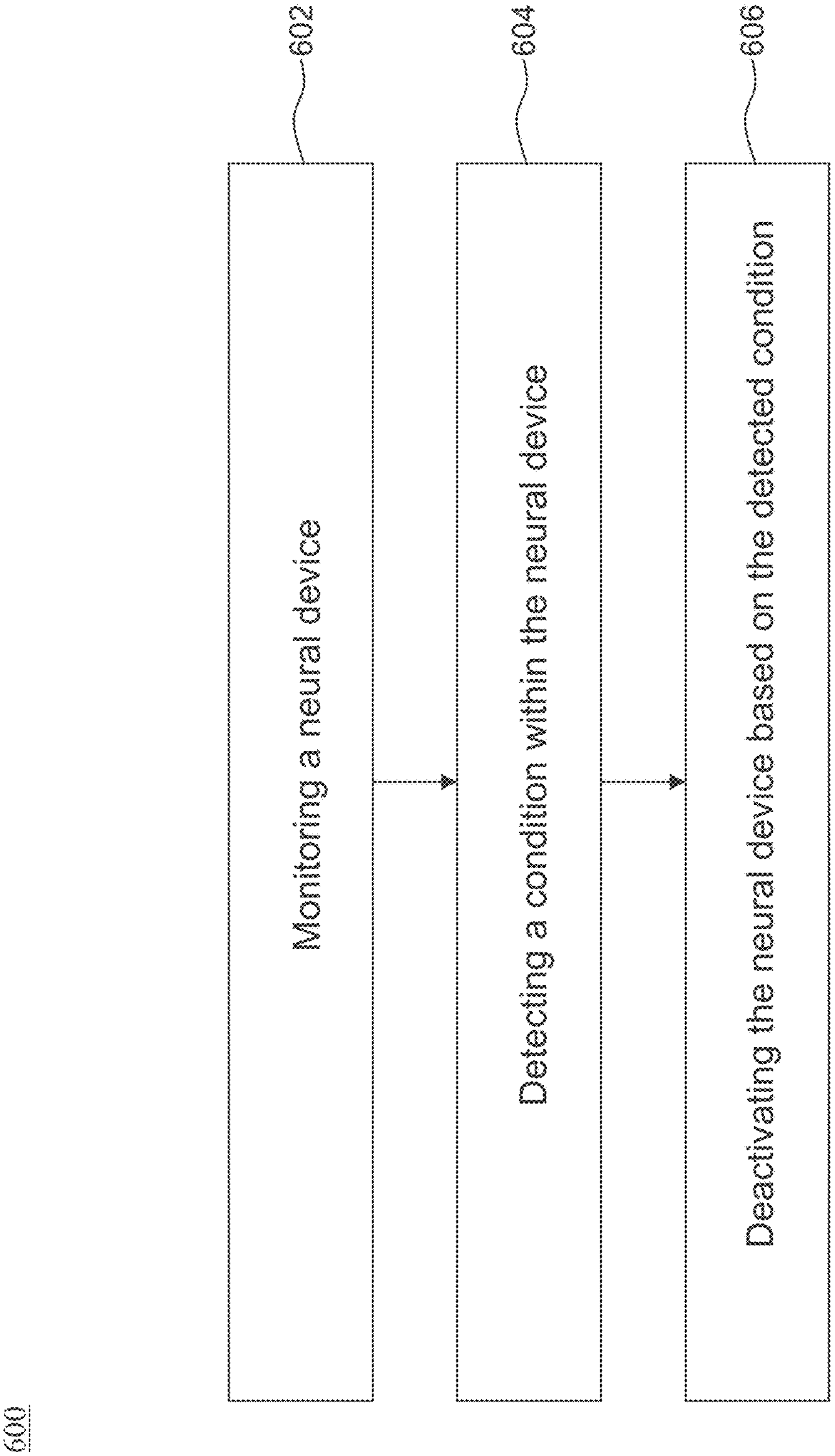
FIG. 6 is a flowchart for a method for performing an emergency shutdown of the neural device, according to an embodiment of the present disclosure.

FIG. 6 is a flowchart for a method 600 for performing an emergency shutdown of the neural device, according to an embodiment. Method 600 can be performed by processing logic that can include hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 6, as will be understood by a person of ordinary skill in the art.

Method 600 shall be described with reference to FIGS. 1-5. However, method 600 is not limited to that example embodiment.

In step 602, the neural device 110 is monitored by the monitoring system 420. Monitoring the neural device 110 can further include at least one of measuring electrode impedance, main supply voltage, and internal reference voltages of the neural device, checking internal battery reserve energy of the neural device, servicing a watchdog timer of the neural device, checking data blocks of the neural device, detecting a tapping sequence of an accelerometer of the neural device, or checking for unauthorized data requests of the neural device.

In step 604, a condition is detected within the neural device 110 by the monitoring system 420. The condition can be at least one of a circuit failure of the neural device 110, a memory corruption of the neural device 110, or an active component failure of the neural device 110. the circuit failure of the neural device can be caused by an electrical short. The memory corruption of the neural device 110 can occur in low-power static memory or in non-volatile memory.

In step 606, the neural device 110 is deactivated by the monitoring system 420, based on the detected condition. Specifically, deactivating the neural device 110 can further include disconnecting a battery power path in the neural device 110. Deactivating the neural device can also further include clearing wireless connections of the neural device 110 or disconnecting a power source of the neural device 110.

Figure 7:
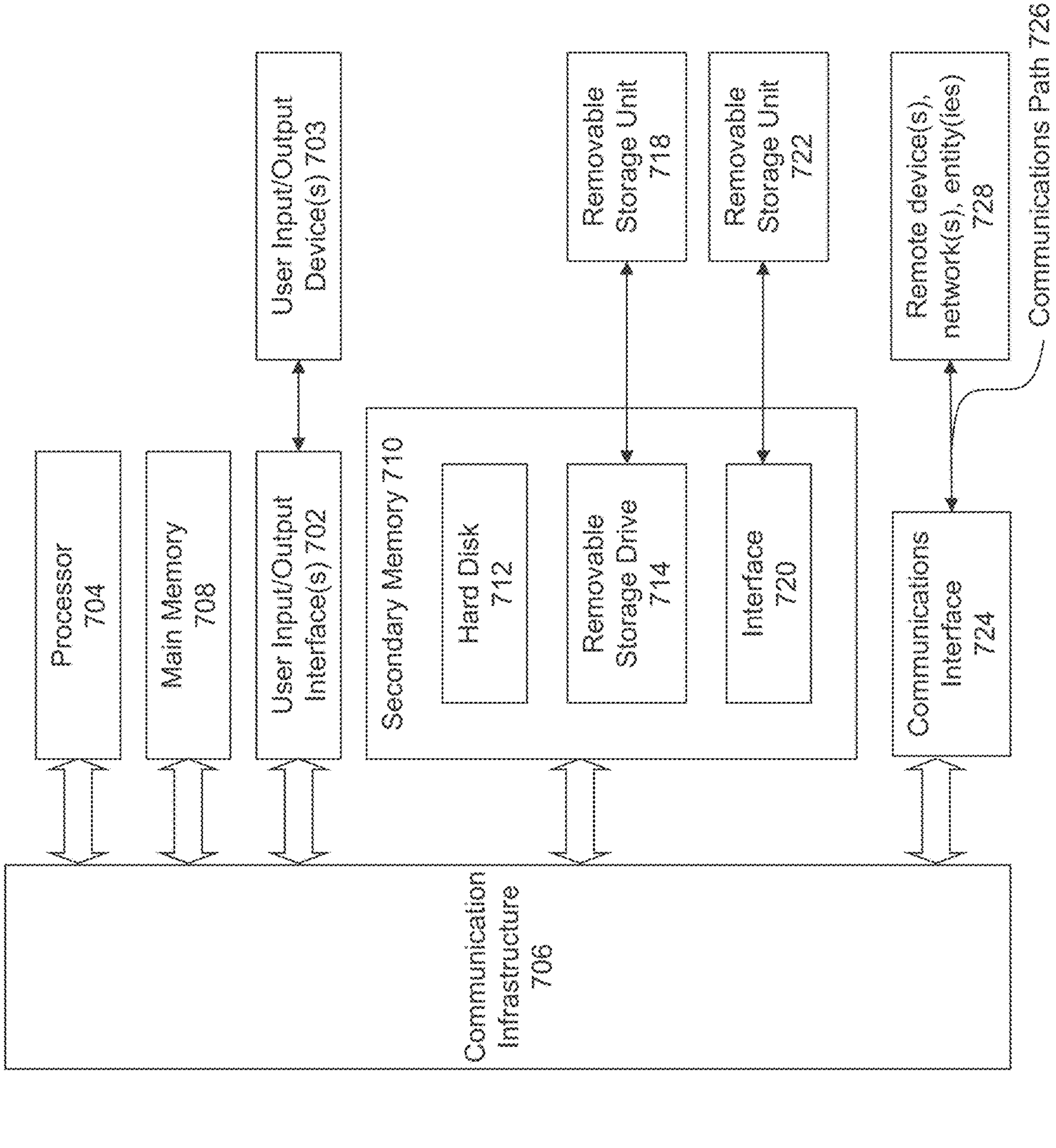
FIG. 7 illustrates an example computer system useful for implementing various embodiments, according to an embodiment of the present disclosure.

Various embodiments can be implemented, for example, using one or more well-known computer systems, such as computer system 700 shown in FIG. 7. For example, the system 100 can be implemented using combinations or sub-combinations of computer system 700. Also or alternatively, one or more computer systems 700 can be used, for example, to implement any of the embodiments discussed herein, as well as combinations and sub-combinations thereof.

Computer system 700 can include one or more processors (also called central processing units, or CPUs), such as a processor 704. Processor 704 can be connected to a communication infrastructure or bus 706.

Computer system 700 can also include user input/output device(s) 703, such as monitors, keyboards, pointing devices, etc., which can communicate with communication infrastructure 706 through user input/output interface(s) 702.

One or more of processors 704 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 can also include a main or primary memory 708, such as random access memory (RAM). Main memory 708 can include one or more levels of cache. Main memory 708 can have stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 can include a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 can read from and/or write to removable storage unit 718.

Secondary memory 710 can include other means, devices, components, instrumentalities or other approaches for allowing computer programs and/or other instructions and/or data to be accessed by computer system 700. Such means, devices, components, instrumentalities or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 can further include a communication or network interface 724. Communication interface 724 can enable computer system 700 to communicate and interact with any combination of external devices, external networks, external entities, etc. (individually and collectively referenced by reference number 728). For example, communication interface 724 can allow computer system 700 to communicate with external or remote devices 728 over communications path 726, which can be wired and/or wireless (or a combination thereof), and which can include any combination of LANs, WANs, the Internet, etc. Control logic and/or data can be transmitted to and from computer system 700 via communication path 726.

Computer system 700 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments can be used, and other changes can be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

Various of the above-disclosed and other features and functions, or alternatives thereof, can be combined into many other different systems or applications. Various presently unforeseen or unanticipated alternatives, modifications, variations or improvements therein can be subsequently made by those skilled in the art, each of which is also intended to be encompassed by the disclosed embodiments.

As used in this document, the singular forms "a," "an," and "the" include plural references unless the context clearly dictates otherwise. With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells as well as the range of values greater than or equal to 1 cell and less than or equal to 3 cells. Similarly, a group having 1-5 cells refers to groups having 1, 2, 3, 4, or 5 cells, as well as the range of values greater than or equal to 1 cell and less than or equal to 5 cells, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

By hereby reserving the right to proviso out or exclude any individual members of any such group, including any sub-ranges or combinations of sub-ranges within the group, which can be claimed according to a range or in any similar manner, less than the full measure of this disclosure can be claimed for any reason. Further, by hereby reserving the right to proviso out or exclude any individual substituents, structures, or groups thereof, or any members of a claimed group, less than the full measure of this disclosure can be claimed for any reason.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by $1/10$ of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art. Where the context of the disclosure indicates otherwise, or is inconsistent with such an interpretation, the above-stated interpretation can be modified as would be readily apparent to a person skilled in the art. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). Further, the transitional term "comprising," which is synonymous with "including," "containing," or "characterized by," is inclusive or open-ended and does not exclude additional, unrecited elements or method steps. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

The terms "patient" and "user" are interchangeable and refer to any living organism which contains neural tissue. As such, the terms "patient" and "user" can include, but are not limited to, any non-human mammal, primate or human. A user can be a mammal such as a primate, for example, a human. The term "user" includes domesticated animals (e.g., cats, dogs, etc.); livestock (e.g., cattle, horses, swine, sheep, goats, etc.), and laboratory animals (e.g., mice, rabbits, rats, gerbils, guinea pigs, possums, etc.). A patient or user can be an adult, child or infant.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

Throughout this disclosure, various patents, patent applications and publications are referenced. The disclosures of these patents, patent applications and publications are incorporated into this disclosure by reference in their entireties in order to more fully describe the state of the art as known to those skilled therein as of the date of this disclosure. This disclosure will govern in the instance that there is any inconsistency between the patents, patent applications and publications cited and this disclosure.

The invention claimed is:

1. An electronically implemented method for controlling a neural device in an implanted system in a subject, the method comprising:

establishing a paired wireless connection to the neural device, the wireless connection connecting the neural device to an external device;

monitoring, by a monitoring device, the neural device, wherein the neural device comprises the monitoring device, the monitoring comprising checking for unauthorized data requests of the neural device;

detecting, by the monitoring device, a condition associated with the neural device, the condition comprising an unauthorized data request of the neural device; and based on the condition detected by the monitoring device, changing an operating state of the neural device to avoid transmission of private data, wherein changing the operation state of the neural device further comprises clearing the wireless connection that is paired to the neural device, wherein clearing the wireless connection comprises clearing the wireless connection such that the wireless connection would have to be reestablished.

2. The method of claim 1, wherein changing the operating state of the neural device further comprises:

deactivating the neural device.

3. The method of claim 2, wherein deactivating the neural device further comprises:

disconnecting a battery power path in the neural device.

4. The method of claim 1, wherein monitoring the neural device further comprises:

measuring one or more of an electrode impedance, a main supply voltage, or an internal reference voltages of the neural device.

5. The method of claim 1, wherein monitoring the neural device further comprises at least one of:

checking internal battery reserve energy of the neural device;

servicing a watchdog timer of the neural device;

checking data blocks of the neural device; or detecting a tapping sequence of an accelerometer of the neural device.

6. The method of claim 1, wherein the condition is at least one of a circuit failure of the neural device, a memory corruption of the neural device, or an active component failure of the neural device.

7. The method of claim 6, wherein the circuit failure of the neural device can be caused by an electrical short.

8. The method of claim 6, wherein the memory corruption of the neural device can occur in low-power static memory or in non-volatile memory.

9. The method of claim 6, wherein the active component failure can be caused by electrostatic discharge (ESD).

10. A system, comprising:

a neural device for implantation in a subject, the neural device comprising a monitoring device;

one or more memories; and at least one processor each coupled to at least one of the one or more memories, the at least one processor configured to perform operations comprising:

establish a paired wireless connection to the neural device, the wireless connection connecting the neural device to an external device;

monitor, by the monitoring device, the neural device by checking for unauthorized data requests of the neural device;

detect, by the monitoring device, a condition within the neural device, the condition comprising an unauthorized data request of the neural device; and based on the condition detected by the monitoring device, changing an operating state of the neural device to avoid transmission of private data, wherein the at least one processor is changes the operating state of the neural device by clearing the wireless connection that is paired to the neural device, wherein clearing the wireless connection comprises clearing the wireless connection such that the wireless connection would have to be reestablished.

11. The system of claim 10, wherein the at least one processor is configured to change the operating state of the neural device by:

deactivating the neural device.

12. The system of claim 11, wherein the at least one processor is configured to deactivate the neural device by:

disconnecting a battery power path in the neural device.

13. The system of claim 10, wherein the at least one processor is configured to monitor the neural device by at least one of:

measuring electrode impedance, main supply voltage, and internal reference voltages of the neural device;

checking internal battery reserve energy of the neural device;

servicing a watchdog timer of the neural device;

checking data blocks of the neural device; or detecting a tapping sequence of an accelerometer of the neural device.

14. The system of claim 10, wherein the condition is at least one of a circuit failure of the neural device, a memory corruption of the neural device, or an active component failure of the neural device.

15. The system of claim 14, wherein the circuit failure of the neural device can be caused by an electrical short.

16. The system of claim 14, wherein the memory corruption of the neural device can occur in low-power static memory or in non-volatile memory.

17. The system of claim 14, wherein the active component failure can be caused by electro-static discharge (ESD).

* * * * *